(12) United States Patent
Li et al.

(10) Patent No.: US 10,367,633 B2
(45) Date of Patent: Jul. 30, 2019

(54) WIRELESS COMMUNICATION

(71) Applicant: Nokia Technologies Oy, Espoo (FI)

(72) Inventors: Zexian Li, Espoo (FI); Athul Prasad, Helsinki (FI); Mikko Aleksi Uusitalo, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 113 days.

(21) Appl. No.: 14/687,087

(22) Filed: Apr. 15, 2015

(65) Prior Publication Data

US 2016/0308662 A1 Oct. 20, 2016

(51) Int. Cl.
*H04L 5/14* (2006.01)
*H04L 5/16* (2006.01)
*H04L 5/00* (2006.01)

(52) U.S. Cl.
CPC .............. *H04L 5/16* (2013.01); *H04L 5/005* (2013.01); *H04L 5/1438* (2013.01)

(58) Field of Classification Search
None
See application file for complete search history.

(56) References Cited

U.S. PATENT DOCUMENTS

| 5,121,382 A | 6/1992 | Yang et al. | |
| 9,450,743 B1* | 9/2016 | Chu | H04L 69/22 |
| 2008/0159185 A1* | 7/2008 | Howard | H04W 72/0406 |
| | | | 370/294 |
| 2009/0280797 A1* | 11/2009 | So | H04B 7/15592 |
| | | | 455/422.1 |
| 2011/0222445 A1 | 9/2011 | Alanara | |
| 2013/0136109 A1* | 5/2013 | Cheng | H04L 1/1861 |
| | | | 370/336 |
| 2013/0286862 A1* | 10/2013 | Sartori | H04W 76/14 |
| | | | 370/252 |
| 2016/0249245 A1* | 8/2016 | Kim | H04B 17/345 |

FOREIGN PATENT DOCUMENTS

| WO | 2011/132179 A1 | 10/2011 |
| WO | 2013/179270 A1 | 12/2013 |
| WO | 2013/182250 A1 | 12/2013 |

OTHER PUBLICATIONS

Han et al., "Full Duplex Networking: Mission Impossible", IEEE Communications Magazine, Oct. 20, 2014, pp. 1-6.
"Full-Duplex Radios for Local Access", Duplo, Retrieved on May 7, 2015, Webpage available at : http://www.fp7-duplo.eu/.
"3rd Generation Partnership Project; Technical Specification Group Radio Access Network; Evolved Universal Terrestrial Radio Access (E-UTRA); User Equipment (UE) radio transmission and reception (Release 12)", 3GPP TS 36.101, V12.6.0, Dec. 2014, 589 pages.

\* cited by examiner

*Primary Examiner* — Jason E Mattis
*Assistant Examiner* — Hong Shao
(74) *Attorney, Agent, or Firm* — Harrington & Smith

(57) ABSTRACT

According to an example aspect of the present invention, there is provided an apparatus comprising at least one processing core configured to determine that the apparatus has uplink information to transmit, to cause a transmitter to transmit a beacon, and to transmit the uplink information using either a full duplex resource or a half duplex resource based at least in part on a determination concerning a response to the beacon, and a receiver configured to listen for the response to the beacon.

19 Claims, 7 Drawing Sheets

WIRELESS COMMUNICATION

FIELD

The present invention relates to the field of wireless communication, such as, for example, to full duplex communication.

BACKGROUND

Wireless communication comprises communication that takes place using electromagnetic radiation, such as optical light or radio waves. Electromagnetic radiation may be encoded with information that it is desired to communicate from a transmitter to a receiver, such that the receiver may decode the information once it receives the electromagnetic radiation.

In wireless communication systems with multiple users, such as for example cellular communication systems, controlling interference is a design goal. Interference occurs when more than one transmitter transmits using a same frequency at the same time. Transmissions on different frequencies do not directly interfere with one another, which is a fundamental aspect of electromagnetic radiation.

Methods for controlling interference include time division multiple access, TDMA, where a radio resource, such as a frequency, is time spliced so that a plurality of terminals can use the radio resource, but only one may use it at any given time. To facilitate TDMA a radio resource may be spliced into frames and/or timeslots, for example.

Another method for controlling interference is frequency division multiple access, FDMA, where a radio resource, such as a frequency band, is spliced to a plurality of frequencies, such that terminals may each be given a frequency to use. Since terminals operate on disparate frequencies, no direct interference occurs between transmissions from such terminals.

Yet further methods for controlling interference include code division multiple access, CDMA, where spreading codes are used to share a same radio resource between a plurality of users, and orthogonal frequency division multiple access, ODFMA, where each user may be assigned a set of subcarriers. Interference mitigation methods may be combined, for example by combining elements of TDMA and CDMA.

Half duplex communication comprises two-way communication by arranging separate radio resources for the communication directions. For example, in a cellular communication system timeslots may be assigned for uplink communication, and separate timeslots may be assigned for downlink communication. Full duplex, on the other hand, involves simultaneous communication in both directions. In a cellular communication example, it may involve simultaneous communication in two directions using the same radio resources.

SUMMARY OF THE INVENTION

The invention is defined by the features of the independent claims. Some specific embodiments are defined in the dependent claims.

According to a first aspect of the present invention, there is provided an apparatus comprising at least one processing core configured to determine that the apparatus has uplink information to transmit, to cause a transmitter to transmit a beacon, and to transmit the uplink information using either a full duplex resource or a half duplex resource based at least in part on a determination concerning a response to the beacon, and a receiver configured to listen for the response to the beacon.

Various embodiments of the first aspect may comprise at least one feature from the following bulleted list:
- the at least one processing core is further configured to cause a scheduling request concerning the uplink information to be transmitted, the scheduling request comprising information concerning the response to the beacon
- the information concerning the response to the beacon comprises an indication as to whether the response was received
- the information concerning the response to the beacon comprises information characterizing content of the response
- the at least one processing core is configured to use the full duplex resource in transmitting the uplink information responsive to the determination concerning the response comprising a determination that no response is received
- the at least one processing core is configured to use the half duplex resource in transmitting the uplink information responsive to the determination concerning the response comprising a determination that the response is received
- the at least one processing core is configured to use either the full duplex resource or the half duplex resource in transmitting the uplink information responsive to a determination concerning content of the response
- the at least one processing core is configured to cause the transmitter to transmit the beacon at least in part responsive to a request from a base station apparatus
- the at least one processing core is configured to cause the transmitter to transmit the beacon in a guard period of a radio frame
- the at least one processing core is further configured to determine whether sufficient guard period resources for transmitting the beacon are available, and responsive to sufficient guard period resources not being available, to cause the beacon to be transmitted using preconfigured non-guard period resources
- the apparatus is or comprises a mobile user equipment.

According to a second aspect of the present invention, there is provided an apparatus comprising at least one processing core, at least one memory including computer program code, the at least one memory and the computer program code being configured to, with the at least one processing core, cause the apparatus at least to schedule a first user equipment to receive downlink information using a full duplex resource, enable selecting either the full duplex resource or a half duplex resource for uplink use for a second user equipment based at least in part on full duplex supplementary information, and instruct the second user equipment to transmit uplink information to the apparatus using the selected full duplex resource or half duplex resource.

Various embodiments of the second aspect may comprise at least one feature from the following bulleted list:
- the full duplex supplementary information comprises information concerning a response to a beacon transmitted by the second user equipment
- the apparatus is configured to obtain the full duplex supplementary information from a scheduling request from the second user equipment, the scheduling request being received in the apparatus the full duplex supplementary information comprises location information concerning the first user equipment and the second user equipment the at least one memory and the computer program code are configured to, with the at least one processing core, cause the apparatus to select the half duplex resource for the second user equipment responsive to a determination, based on the location information concerning the first user equipment and the second user equipment, that the first user equipment and second user equipment are located nearer to each other than a preconfigured threshold distance the at least one memory and the computer program code are configured to, with the at least one processing core, cause the apparatus to instruct the second user equipment to select the full duplex resource or the half duplex resource based on a criterion relating to beaconing.

According to a third aspect of the present invention, there is provided a method comprising determining that an apparatus has uplink information to transmit, causing a transmitter to transmit a beacon, listening for a response to the beacon, and transmitting the uplink information using either a full duplex resource or a half duplex resource based at least in part on a determination concerning a response to the beacon.

Various embodiments of the third aspect may comprise at least one feature corresponding to a feature from the preceding bulleted list laid out in connection with the first aspect.

According to a fourth aspect of the present invention, there is provided a method comprising scheduling a first user equipment to receive downlink information using a full duplex resource, enabling selecting either the full duplex resource or a half duplex resource for uplink use for a second user equipment based at least in part on full duplex supplementary information, and instructing the second user equipment to transmit uplink information to the apparatus using the selected full duplex resource or half duplex resource.

Various embodiments of the fourth aspect may comprise at least one feature corresponding to a feature from the preceding bulleted list laid out in connection with the second aspect.

According to a fifth aspect of the present invention, there is provided an apparatus comprising means for determining that an apparatus has uplink information to transmit, means for causing a transmitter comprised in the apparatus to transmit a beacon, means for listening for a response to the beacon, and means for transmitting the uplink information using either a full duplex resource or a half duplex resource based at least in part on a determination concerning a response to the beacon.

According to a sixth aspect of the present invention, there is provided an apparatus comprising means for scheduling a first user equipment to receive downlink information using a full duplex resource, means for enabling selecting either the full duplex resource or a half duplex resource for uplink use for a second user equipment based at least in part on full duplex supplementary information, and means for instructing the second user equipment to transmit uplink information to the apparatus using the selected full duplex resource or half duplex resource.

According to a seventh aspect of the present invention, there is provided a non-transitory computer readable medium having stored thereon a set of computer readable instructions that, when executed by at least one processor, cause an apparatus to at least determine that an apparatus has uplink information to transmit, cause a transmitter comprised in the apparatus to transmit a beacon, listen for a response to the beacon, and transmit the uplink information using either a full duplex resource or a half duplex resource based at least in part on a determination concerning a response to the beacon.

According to an eighth aspect of the present invention, there is provided a non-transitory computer readable medium having stored thereon a set of computer readable instructions that, when executed by at least one processor, cause an apparatus to at least schedule a first user equipment to receive downlink information using a full duplex resource, enable selecting either the full duplex resource or a half duplex resource for uplink use for a second user equipment based at least in part on full duplex supplementary information, and instruct the second user equipment to transmit uplink information to the apparatus using the selected full duplex resource or half duplex resource.

According to a ninth aspect of the present invention, there is provided a method, comprising scheduling a first user equipment to transmit uplink information using a full duplex radio resource, determining downlink information to be transmitted to a second user equipment, requesting the second user equipment to listen for a full duplex beacon, and responsive to an indication from the second user equipment that no full duplex beacon was received in the second user equipment, transmitting the downlink information to the second user equipment using the full duplex radio resource.

According to a tenth aspect of the present invention, there is provided a computer program configured to cause a method in accordance with at least one of the third and fourth aspects to be performed.

EMBODIMENTS

A user equipment may transmit a beacon before transmitting in the uplink direction using a full duplex radio resource, such as a subframe, that is shared between uplink and downlink transmission. In case a user equipment intending to receive downlink information using the same full duplex resource receives the beacon, it may respond to warn the uplink user equipment of potential interference.

Figure 1:
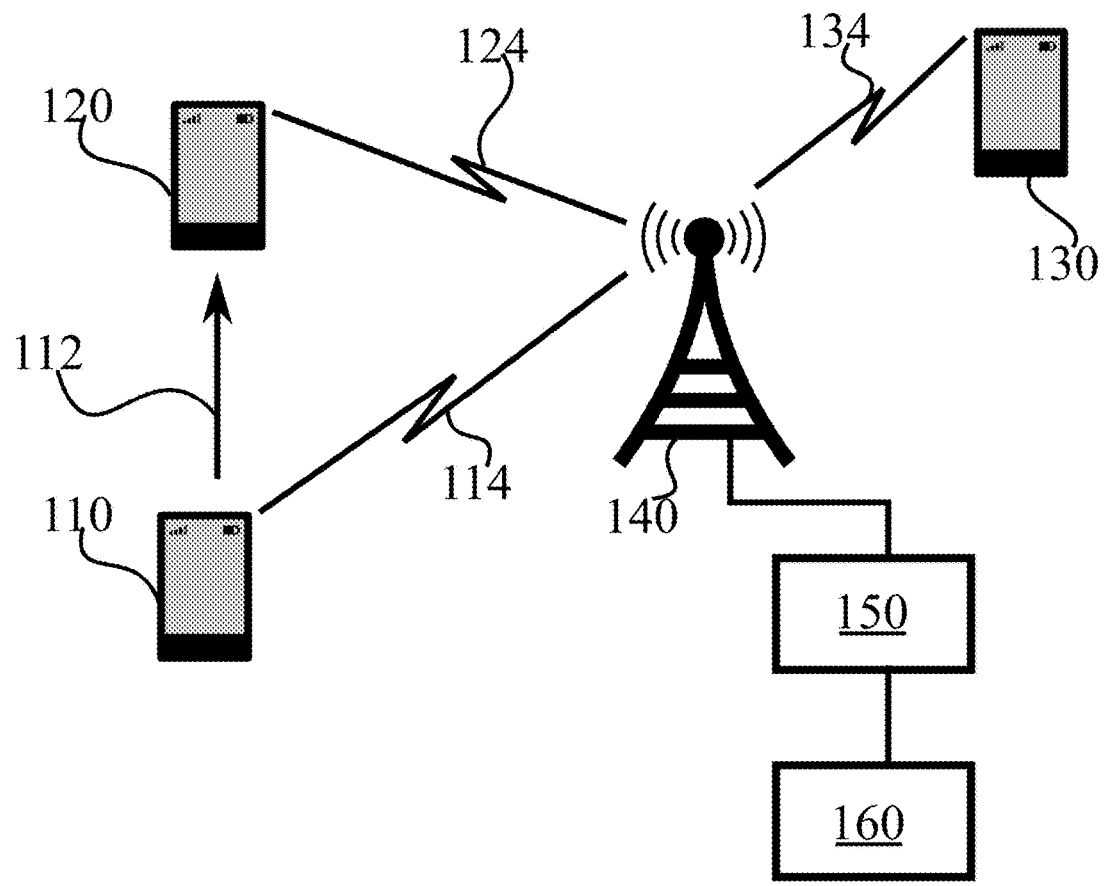
FIG. 1 illustrates a system in accordance with at least some embodiments of the present invention.

FIG. 1 illustrates a system in accordance with at least some embodiments of the present invention. The system of FIG. 1 comprises user equipments 110, 120 and 130. Each of user equipments 110, 120 and 130 may be configured to operate in accordance with a same communication technology, which may comprise, for example, long term evolution, LTE, wideband code division multiple access, WCDMA, or another technology. In some embodiments, not all of user equipments 110, 120 and 130 operate in accordance with the same technology. User equipment 110 is in communication with base station 140 via wireless link 114, which may comprise an uplink arranged to convey information from user equipment 110 to base station 140, and/or a downlink arranged to convey information from base station 140 to user equipment 110. User equipment 120 is in communication with base station 140 via wireless link 124. Wireless link 124 may be of a same type as wireless link 114, for example. User equipment 130 is in communication with base station 140 via wireless link 134. Wireless link 134 may be of a same type as wireless link 114 and/or wireless link 124, for example.

Base station 120 may be arranged to support a same communication technology as user equipments 110, 120 and 130. In some embodiments, base station 140 is arranged to support more than one communication technology, such as, for example, WCDMA and wireless local area network, WLAN. Base station 140 is communicatively coupled with core network node 150. Such coupling may traverse at least one intermediate node that is not illustrated in FIG. 1. Core network node 150 may comprise a mobility management entity, MME, switch or other core network node, for example. Core network node 150 may be communicatively coupled with a further core network node 160, which may comprise a gateway node, for example, enabling communication with further networks. The couplings between base station 140 and core network node 150, and between core network node 150 and further core network node 160, may comprise wire-line connections, for example.

Base station 140 may be comprised in a radio-access network that comprises a plurality of further base stations. A radio-access network may further comprise, depending on the technology used, at least one base station controller, radio network controller or other node configured to control base stations and, optionally, to interface with a core network.

The system of FIG. 1 uses radio frames which are subdivided into subframes, which may alternatively be known as timeslots, depending on the technology used. In this example, a subset of the subframes comprises half duplex subframes and a separate subset of the subframes comprises full duplex subframes. In the present context, in general, half duplex radio resources may be used for one-way transmission, and full duplex radio resources may be used for two-way simultaneous transmission such that the same radio resources is used at the same time for uplink and downlink communication, potentially by two or more user equipments. An example of a radio resource is a subframe. Radio frames may further comprise guard periods, GP, which help avoid interference between uplink subframes and downlink subframes. GPs may further provide transceivers time to switch between transmission, TX, and reception, RX, modes of operation. User equipments 110, 120 and 130 may be disposed at different distances from base station 140, wherefore in case an uplink subframe was not separated from a downlink subframe by a guard period, it could occur that an uplink transmission from a first user equipment interferes with a downlink reception at a second user equipment, for example.

In FIG. 1, user equipment 130 receives downlink information from base station 140 via wireless link 134 using a half duplex subframe. User equipment 120 is to receive downlink information from base station 140, via wireless link 124 using a full duplex subframe. User equipment 110 is to transmit uplink information to base station 140 via wireless link 114, potentially also using the full duplex subframe. Since user equipment 110 may transmit on the same radio resources that user equipment 120 plans to use to receive information, the transmission from user equipment 110 may cause interference to the reception that user equipment 120 will attempt. This is illustrated schematically in FIG. 1 as interference 112. Whether interference 112 is severe enough to impair reception in user equipment 120 may depend, for example, on how close user equipment 110 is to user equipment 120, a radio path between these user equipments, a transmission power used by user equipment 110, and a transmission power used by base station 140.

Base station 140 may generate self-interference as it transmits downlink information to user equipment 120 on the same full duplex radio resources, at the same time, as it receives uplink information from user equipment 110. Such self-interference may be controlled, at least in part, using interference cancellation techniques. Interference 112 may be more difficult to control using interference cancellation techniques, since the relative positions of user equipment 110 and user equipment 120 may be unknown in user equipment 120, at least with any precision. As interference 112 is created from an uplink transmission into a downlink reception, this type of interference may be known as uplink to downlink interference, or UL to DL interference.

To control, at least in part, interference 112, user equipment 110 may be configured to transmit a beacon before using the full duplex subframe for uplink transmission. Such a beacon may be known as a full duplex beacon, for example. User equipment 110 may be arranged to transmit the beacon before using a full duplex radio resource, such as a subframe, for uplink transmission. The beacon may be broadcast, for example, wherein broadcasting may comprise a wireless transmission that is not addressed to any specifically identified user equipment. After transmitting the beacon, user equipment 110 may listen for a response. If no response is received, user equipment 110 may proceed with the full duplex subframe uplink transmission. In some embodiments, user equipment 110 is configured to send a scheduling request before using the full duplex subframe, including in the scheduling request information about the usage of full duplex subframe. In case no user equipment can receive the beacon, then it may be that no user equipment is close enough in radio path terms to suffer interference 112 from the uplink transmission. On the other hand, at least one user equipment may be nearby, but not receiving or about to receive downlink information on a full duplex subframe, and thus such user equipments would not reply to the beacon. On the other hand, in case a user equipment that is to use the full duplex resource for downlink is nearby, but a radio path between the uplink user equipment and this downlink user equipment is strongly attenuating, no interference 112 is likely to occur even though the user equipments are geographically close to each other.

In case user equipment 120 receives the beacon from user equipment 110, it may transmit a response, for example by broadcasting, responsive to a determination that it is due to receive downlink information using full duplex radio resources, such as, for example, a full duplex subframe. The response may comprise a simple indication that the beacon was received. Such an indication may be presented using a single bit, 0 or 1, for example. Alternatively, user equipment 120 may be configured to include in the response an indication relating to a signal strength at which the beacon was received in user equipment 120. Such an indication of signal strength may be presented, for example, using four, six or eight bits. In some embodiments, the indication of signal strength may be used by user equipment 110 and/or base station 140 to determine a maximum transmit power user equipment 110 may use when transmitting uplink information using the full duplex radio resources, without causing excessive interference 112 to user equipment 120.

After listening for replies to the beacon, user equipment 110 may signal to base station 140, for example by transmitting a scheduling request. The scheduling request may comprise, or be provided with, an indication concerning whether any reply to the beacon was received. In case a response to the beacon comprised an indication of signal strength, user equipment 110 may include in the scheduling request information characterizing the indication of signal strength. Such information may comprise the indication, for example. The scheduling request may comprise a request to use the full duplex radio resource or the half duplex radio resource. User equipment 110 may be configured to select to request either the full duplex resource or the half duplex resource at least in part in dependence of the response.

Responsive to the scheduling request from user equipment 110, base station 140 may allocate radio resources to user equipment 110 for transmission of the uplink information. For example, in case no response to the beacon was received by user equipment 110, base station 140 may instruct user equipment 110 to transmit the uplink information using full duplex radio resources, such as, for example a full duplex subframe. In case a response to the beacon was received with an indication of signal strength, base station 140 may instruct user equipment 110 to transmit the uplink information using full duplex radio resources, such as, for example a full duplex subframe, using at most a threshold power which the base station may derive in dependence of the information characterizing the indication of signal strength. In case the threshold power would be insufficient for communication between user equipment 110 and base station 140, half duplex radio resources may be used by user equipment 110. The decision whether the threshold power is sufficient may be taken by base station 140 or user equipment 110, for example. In case a response to the beacon was received with no indication of signal strength, base station 140 may instruct user equipment 110 to use the half duplex radio resources.

In some embodiments, base station 140 is configured to transmit to user equipment 110 a request to send a beacon. In these embodiments, user equipment 110 may be configured to transmit the beacon responsive to the request, and to use full duplex radio resources or the half duplex radio resources in dependence of a response to the beacon. For example, where no response is received, user equipment 110 may use full duplex radio resources and where a response is received, user equipment 110 may use half duplex radio resources. Similarly, where a response is received with a signal strength indication that indicates the beacon was received at a signal level low enough to allow user equipment 110 to use full duplex resources, the full duplex resources may be used. If the signal strength indicator in the response indicates the beacon was received at a strong signal level, it implies that transmissions from user equipment 110 would interfere strongly with reception at the user equipment transmitting the response, and consequently user equipment 110 would in this case use half duplex radio resources to avoid causing interference. In some embodiments, in case the base station instructs user equipment 110 to transmit a beacon, user equipment 110 may thereafter use the full duplex resources without transmitting a separate scheduling request to the base station, in dependence of any response to the beacon as described above. The base station may request the user equipment to transmit the beacon in connection with allocating use of the full duplex radio resource to the user equipment for uplink transmission. In other words, the base station may be configured to conditionally assign the full duplex radio resources to the user equipment, wherein the condition may comprise beaconing as described above.

The beacon may be transmitted in a guard period, for example. A benefit of using a guard period may comprise that no communications are displaced by the beacon. Further, certain technologies comprise a transient period in connection with a guard period, which may provide additional time to transmit the beacon. A response to a beacon may be transmitted in a guard period or transient period if such periods are available before the full duplex resources, or, alternatively or additionally, a random access resource or separate preconfigured resource may be employed in transmitting the response. In some embodiments, a user equipment may determine whether a suitable guard period is available for transmitting the beacon, and in case no suitable guard period is available, the user equipment is configured to use separate preconfigured resources to transmit the beacon.

In some embodiments, base station 140 has at least a limited knowledge of locations of at least some user equipments that are in a cell controlled by the base station. In this case, base station 140 may employ this knowledge in allocating full duplex radio resources. For example, base station 140 may be configured to not allocate the same full duplex radio resources for simultaneous uplink and downlink use to two user equipments if base station 140 has knowledge that these two user equipments are disposed near each other. As another example, base station 140 may be configured, responsive to a determination that two user equipments are disposed near each other, allocate full duplex radio resources for simultaneous uplink and downlink use for these two user equipments in a conditional sense, the conditional sense comprising that the base station transmits a request to the user equipment that is to transmit in the uplink to transmit a beacon before using the full duplex radio resources for uplink transmission. The uplink user equipment may then only allowed to use the full duplex resources if the beaconing indicates it may be done without causing interference to the other user equipment, as described above.

In general, information base station 140 receives concerning beaconing from user equipment 120, or other usable information, may be termed full duplex supplementary information. Thus full duplex supplementary information may comprise at least one of: information on whether a response to a beacon was received, information characterizing contents of such a response and location information concerning user equipments.

Figure 2:
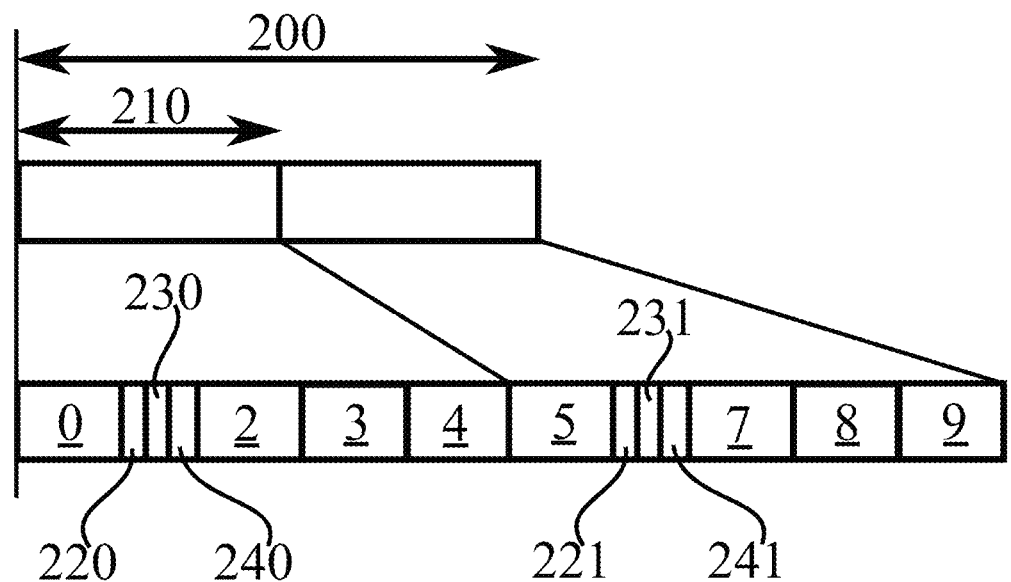
FIG. 2 illustrates an example radio frame format that is usable in at least some embodiments of the present invention.

FIG. 2 illustrates an example radio frame format that is usable in at least some embodiments of the present invention. A radio frame has length 200, which may be 10 milliseconds, for example. In this example, a half frame has a length 210 of 5 milliseconds. The first half frame comprises subframes 0, 2, 3 and 4, of which subframe 3 may be a full duplex subframe, for example, and the others half duplex subframes, for example. A guard period 230 is preceded by a downlink pilot time slot DwPTS 220. Guard period 230 is succeeded by uplink pilot time slot UpPTS 240.

The second half frame comprises subframes 5, 7, 8 and 9 of which subframe 8 may be a full duplex subframe and the others half duplex subframes, for example. Guard period 231 is preceded by a downlink pilot time slot DwPTS 221. Guard period 231 is succeeded by uplink pilot time slot UpPTS 241.

Figure 3:
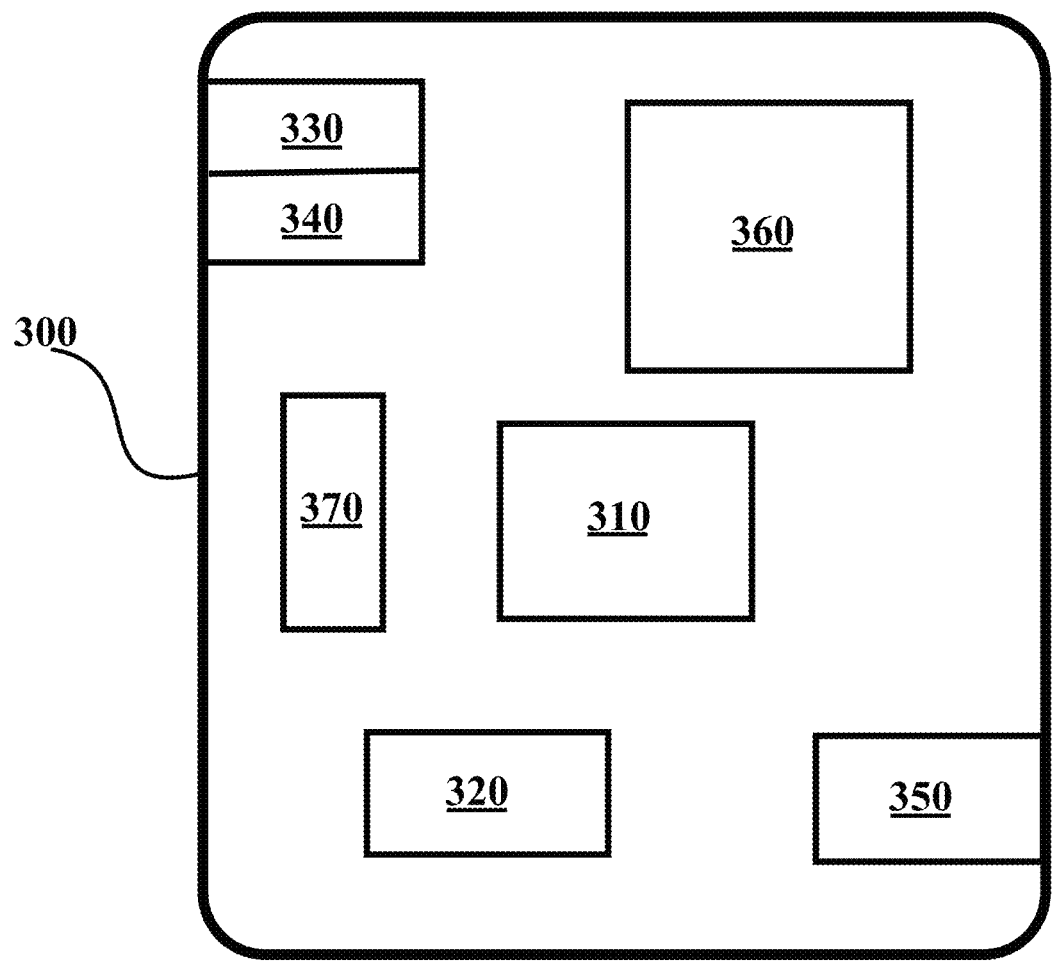
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a mobile communication device such as user equipment 110 of FIG. 1, for example. Some aspects of the illustrated device have corresponding structure in base station 140 of FIG. 1 as well. Comprised in device 300 is processor 310, which may comprise, for example, a single- or multi-core processor wherein a single-core processor comprises one processing core and a multi-core processor comprises more than one processing core. Processor 310 may comprise more than one processor. A processing core may comprise, for example, a Cortex-A8 processing core manufactured by ARM Holdings or a Steamroller processing core produced by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
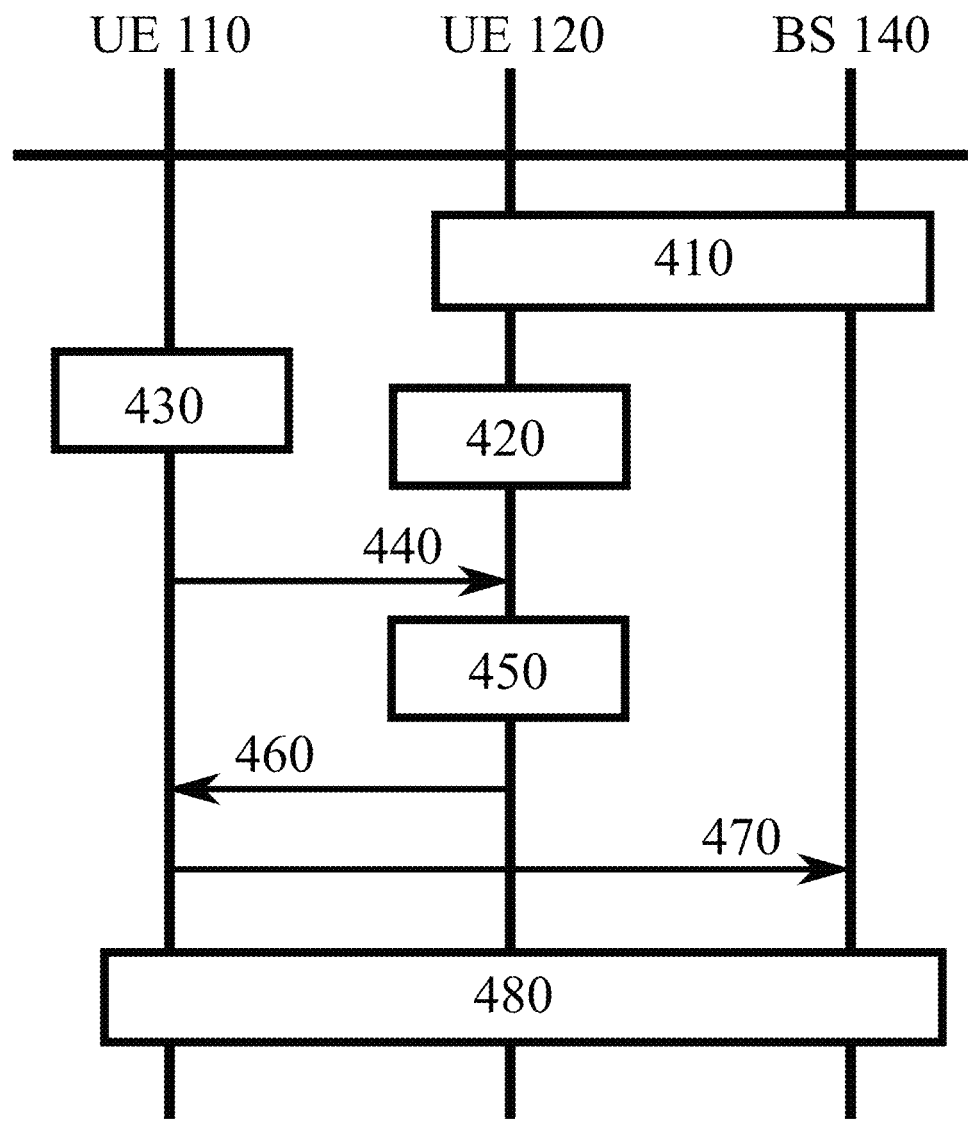
FIG. 4 illustrates signalling according to at least some embodiments of the present invention.

FIG. 4 illustrates signalling according to at least some embodiments of the present invention. On the vertical axes are disposed, from left to right, in terms of FIG. 1, user equipment 110, user equipment 120 and, finally, base station 140. Time advances from the top toward the bottom.

Phase 410 comprises scheduling, by base station 140, user equipment 120 to use full duplex radio resources, such as a full duplex subframe, for reception of downlink information. Phase 420 comprises user equipment 120 beginning to listen for a full duplex beacon transmission.

In phase 430, user equipment 110 determines that it has uplink information to transmit, and responsively in phase 440 user equipment 110 transmits a beacon. Although illustrated in FIG. 4 as an arrow to user equipment 120, the beacon may be broadcast and need not be specifically addressed to user equipment 120. In phase 450, user equipment 120 receives the beacon and compiles a response thereto. The response is transmitted in phase 460.

In phase 470, user equipment 110 may transmit a scheduling request to base station 140. The scheduling request may comprise, or be provided with, information concerning the response to the beacon. Such information may comprise an indication as to whether the response was received and/or the information concerning the response to the beacon may comprise information characterizing contents of the response. Contents of the response may comprise a signal strength indication informing of a signal level at which user equipment 120 received the beacon of phase 440. Scheduling request 470 may comprise, as described above, a request to use the full duplex resource or a request to use the half duplex resource. In phase 480 base station 140 may allocate radio resources, such as, for example at least one of full duplex radio resources and half duplex radio resources, based at least in part on the information concerning the response received in base station 140 in phase 470.

Figure 5:
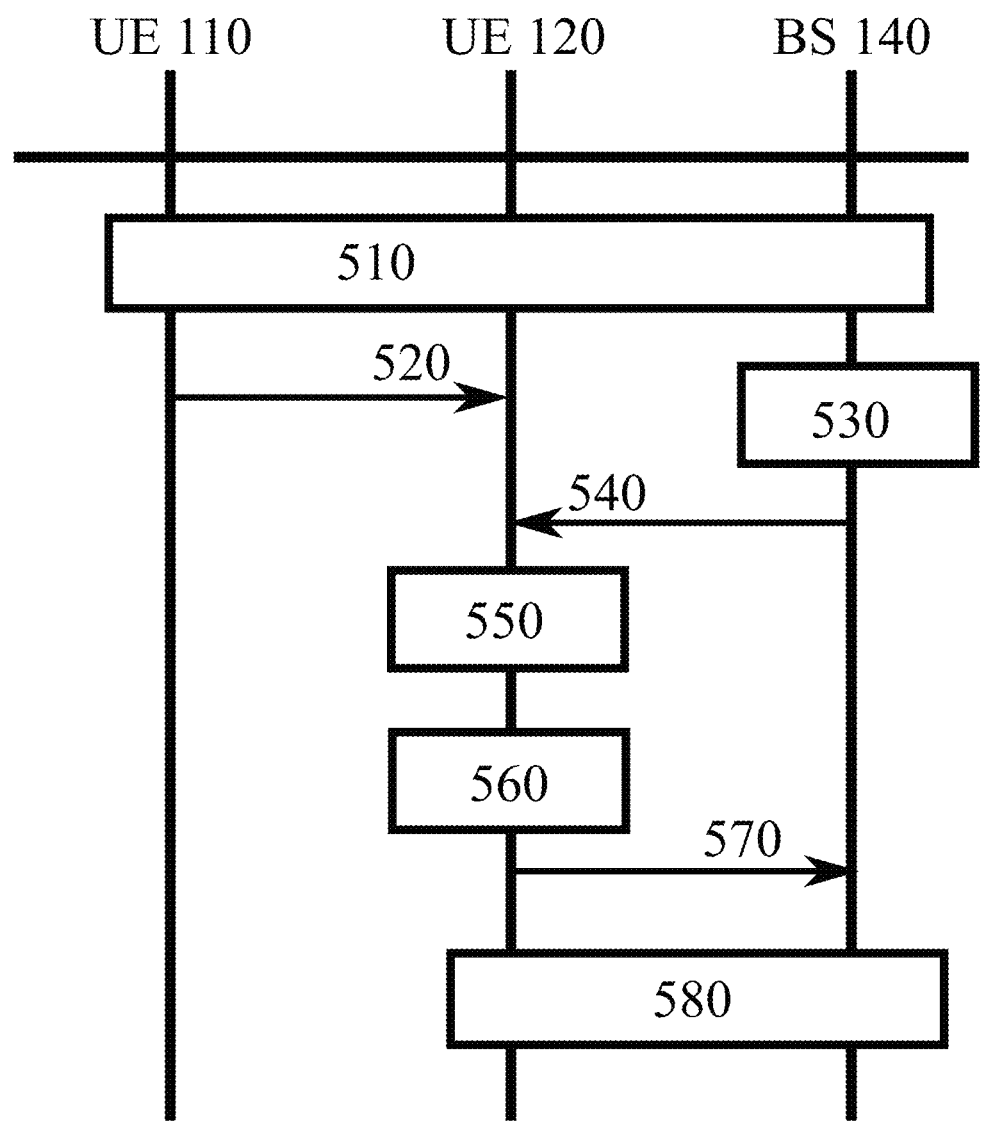
FIG. 5 illustrates signalling according to at least some embodiments of the present invention.

FIG. 5 illustrates signalling according to at least some embodiments of the present invention. The axes correspond to those of FIG. 4.

Phase 510 comprises scheduling user equipment 110 to use full duplex radio resources to communicate uplink information. In phase 520 user equipment 110 transmits a beacon to investigate, whether the full duplex radio resources can be used without causing excessive UL to DL interference. As no response is received in user equipment 110, its use of the full duplex radio resources can proceed.

Separately, base station 140 may determine, in phase 530, that it has downlink information to transmit to user equipment 120. In phase 540 base station 140 may request user equipment 120 to listen for a full duplex beacon. Responsively, in phase 550 user equipment 120 listens for a beacon, and in phase 560 user equipment 120 determines that no beacon was detected, for example during a specific listening period. Base station 140 may be informed that no beacon was detected, in phase 570, responsive to which base station 140 may use the full duplex radio resources to transmit the downlink information to user equipment 120. This downlink transmission occurs in phase 580.

Figure 6:
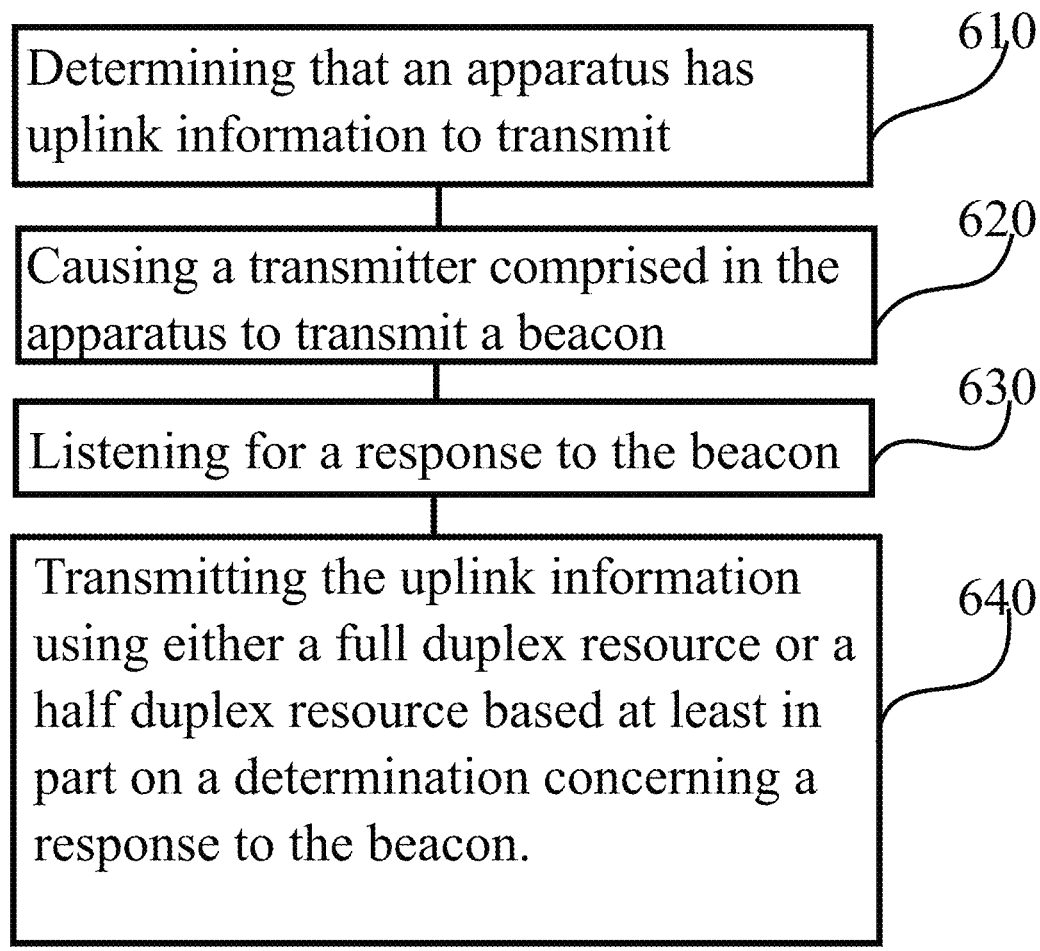
FIG. 6 is a first flow graph of a first method in accordance with at least some embodiments of the present invention.

FIG. 6 is a first flow graph of a first method in accordance with at least some embodiments of the present invention. The phases of the illustrated method may be performed in a user equipment, or in a control device, such as a chipset, for example, configured to control the functioning of a user equipment when implanted therein.

Phase 610 comprises determining that an apparatus has uplink information to transmit. Phase 620 comprises causing a transmitter comprised in the apparatus to transmit a beacon. Phase 630 comprises listening for a response to the beacon. Finally, phase 640 comprises transmitting the uplink information using either a full duplex resource or a half duplex resource based at least in part on a determination concerning a response to the beacon. In some embodiments, the method further comprises a phase wherein a scheduling request is transmitted from the apparatus to a base station. Such a scheduling request may comprise information concerning the response to the beacon.

Figure 7:
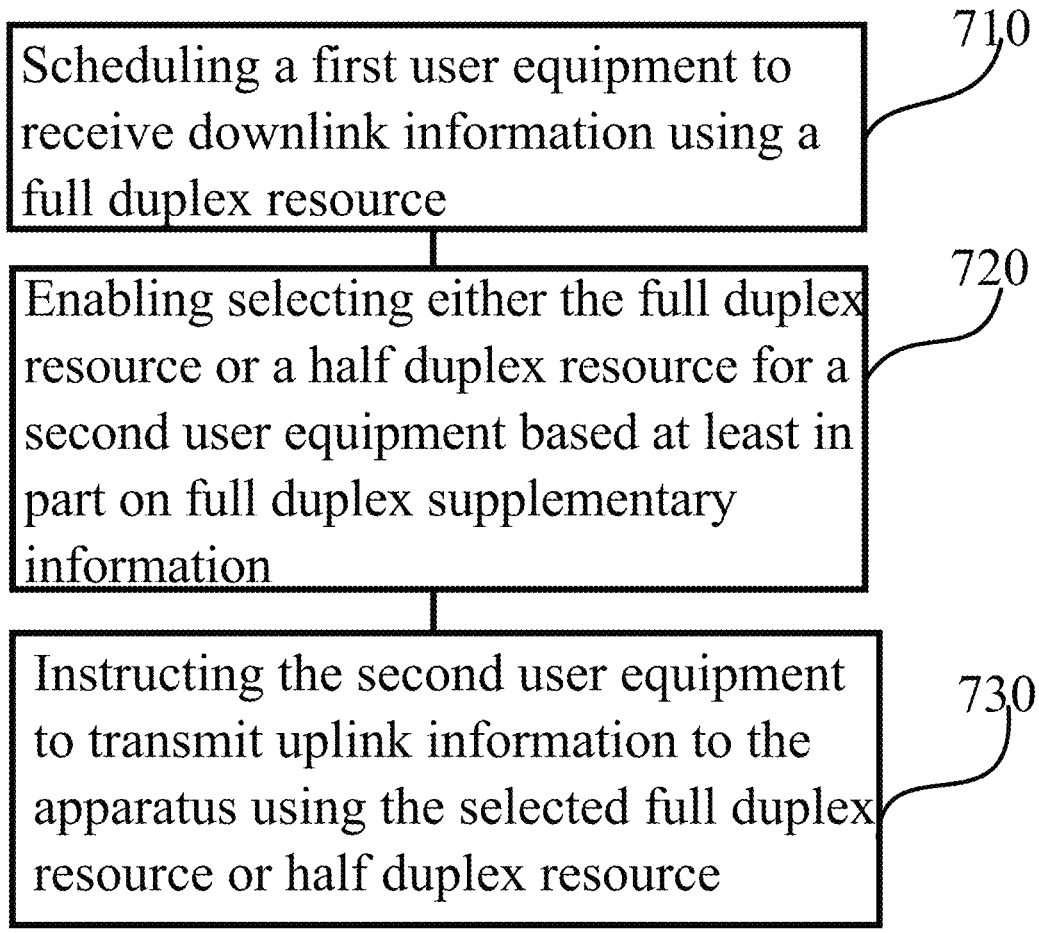
FIG. 7 is a second flow graph of a second method in accordance with at least some embodiments of the present invention.

FIG. 7 is a second flow graph of a second method in accordance with at least some embodiments of the present invention. The phases of the illustrated method may be performed in a base station, or in a control device, such as a chipset, for example, configured to control the functioning of a base station when implanted therein.

Phase 710 comprises scheduling a first user equipment to receive downlink information using a full duplex resource. Phase 720 comprises enabling selecting either the full duplex resource or a half duplex resource for uplink use for a second user equipment based at least in part on full duplex supplementary information. Finally, phase 730 comprises instructing the second user equipment to transmit uplink information to the apparatus using the selected one of the full duplex resource and the half duplex resource. The selecting may take place in the apparatus performing the method of FIG. 7 or in the second user equipment, for example.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in facilitating wireless communication, such as, for example, wireless communication using full duplex resources.

ACRONYMS LIST

CDMA Code Division multiple access
DL Downlink
DwPTS Downlink pilot time slot
FDMA Frequency division multiple access
GP Guard period
OFDMA Orthogonal Frequency Division Multiple Access
TDMA Time division multiple access
FDC Full Duplex Communication
HD Half duplex
LTE Long term evolution
UL Uplink
UpPTS Uplink pilot time slot
WCDMA wideband code division multiple access
WLAN wireless local area network

| REFERENCE SIGNS LIST | |
|---|---|
| 110 | User equipment |
| 120 | User equipment |
| 130 | User equipment |
| 140 | Base station |
| 150 | Core network node |
| 160 | Further core network node |
| 114, 124, 134 | Wireless link |
| 112 | Interference |
| 200 | Radio frame length |
| 210 | Half frame length |
| 220, 221 | DwPTS |
| 230, 231 | Guard period |
| 240, 241 | UpPTS |
| 410-480 | Phases of FIG. 4 method |
| 510-580 | Phases of FIG. 5 method |
| 610-640 | Phases of FIG. 6 method |
| 710-730 | Phases of the FIG. 7 method |

The invention claimed is:

1. An apparatus comprising:
at least one processing core configured to:
determine that the apparatus has uplink information to transmit;
cause a transmitter to transmit a beacon in response to the determination that the apparatus has the uplink information to transmit;
make at least one determination concerning a response to the beacon;
transmit information or a request about whether to use a half duplex resource or a full duplex resource based at least in part on the at least one determination concerning the response to the beacon, and
transmit the uplink information using either a full duplex resource or a half duplex resource, wherein the apparatus uses the full duplex resource to transmit the uplink information in response to a determination that no response to the beacon is received; and
a receiver configured to listen for the response to the beacon.

2. The apparatus according to claim 1, wherein the at least one processing core is further configured to cause a scheduling request concerning the uplink information to be transmitted, the scheduling request comprising information concerning the response to the beacon.

3. The apparatus according to claim 2, wherein the information concerning the response to the beacon comprises an indication as to whether the response was received.

4. The apparatus according to claim 2, wherein the information concerning the response to the beacon comprises information characterizing content of the response.

5. The apparatus according to claim 1, wherein the at least one processing core is configured to use the half duplex resource in transmitting the uplink information responsive to the determination concerning the response comprising a determination that the response is received.

6. The apparatus according to claim 1, wherein the at least one processing core is configured to use either the full duplex resource or the half duplex resource in transmitting the uplink information responsive to a determination concerning content of the response.

7. The apparatus according to claim 1, wherein the at least one processing core is configured to cause the transmitter to transmit the beacon at least in part responsive to a request from a base station apparatus.

8. The apparatus according to claim 1, wherein the at least one processing core is configured to cause the transmitter to transmit the beacon in a guard period of a radio frame.

9. The apparatus according to claim 1, wherein the at least one processing core is further configured to determine whether sufficient guard period resources for transmitting the beacon are available, and responsive to sufficient guard period resources not being available, to cause the beacon to be transmitted using preconfigured non-guard period resources.

10. The apparatus according to claim 1, wherein the apparatus comprises a mobile user equipment.

11. An apparatus comprising at least one processing core, at least one memory including computer program code, the at least one memory and the computer program code being configured to, with the at least one processing core, cause the apparatus at least to:
schedule a first user equipment to receive downlink information using a full duplex resource;
receive full duplex supplementary information from a second user equipment, wherein the full duplex supplementary information comprises information or a request about whether to use a half duplex resource or a full duplex resource based at least in part on a determination concerning a response to a beacon transmitted by the second user equipment in response to a determination that the second user equipment has the uplink information to transmit;
enable selecting either the full duplex resource or the half duplex resource for use for the second user equipment; and
instruct the second user equipment to transmit the uplink information to the apparatus or transmit downlink data to the second user equipment using the selected full duplex resource or half duplex resource, wherein the second user equipment is to transmit the uplink information using the full duplex resource in response to a determination that no response to the beacon is received.

12. The apparatus according to claim 11, wherein the apparatus is configured to obtain the full duplex supplementary information from a scheduling request from the second user equipment, the scheduling request being received in the apparatus.

13. The apparatus according to claim 11, wherein the full duplex supplementary information comprises location information concerning the first user equipment and the second user equipment.

14. A method comprising:
    determining that an apparatus has uplink information to transmit;
    causing a transmitter to transmit a beacon in response to the determination that the apparatus has the uplink information to transmit;
    making at least one determination concerning a response to the beacon;
    transmitting information or a request about whether to use a half duplex resource or a full duplex resource based at least in part on the at least one determination concerning the response to the beacon;
    listening for the response to the beacon, and
    transmitting the uplink information using either the full duplex resource or the half duplex resource, wherein the apparatus uses the full duplex resource to transmit the uplink information in response to a determination that no response to the beacon is received.

15. The method according to claim 14, further comprising causing a scheduling request concerning the uplink information to be transmitted, the scheduling request comprising information concerning the response to the beacon.

16. The method according to claim 14, wherein the information concerning the response to the beacon comprises an indication as to whether the response was received.

17. The method according to claim 15, wherein the information concerning the response to the beacon comprises information characterizing content of the response.

18. The method according to claim 14, wherein the information concerning the response to the beacon comprises information characterizing content of the response.

19. The method according to claim 15, further comprising:
    using the half duplex resource in transmitting the uplink information responsive to the determination concerning the response comprising a determination that the response is received.

* * * * *